(12) United States Patent
Parthasarathy et al.

(10) Patent No.: US 9,054,069 B2
(45) Date of Patent: Jun. 9, 2015

(54) VARIABLE CAPACITANCE INTEGRATED CIRCUIT

(71) Applicant: International Business Machines Corporation, Armonk, NY (US)

(72) Inventors: Shyam Parthasarathy, Bangalore (IN); Ananth Sundaram, Bangalore (IN); Balaji Swaminathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/018,452

(22) Filed: Sep. 5, 2013

(65) Prior Publication Data

US 2015/0061072 A1    Mar. 5, 2015

(51) Int. Cl.
  *H01L 21/02* (2006.01)
  *H01L 49/02* (2006.01)
  *H01G 7/00* (2006.01)

(52) U.S. Cl.
  CPC . *H01L 28/40* (2013.01); *H01G 7/00* (2013.01)

(58) Field of Classification Search
  CPC ....... H01G 11/02; H01G 11/24; H01G 11/26; H01G 9/155; H01G 9/00; H01G 9/008; H01G 7/00; H01L 28/40; H01L 28/2816; H01L 28/86; H01L 23/5223; H01L 27/0805
  USPC .......... 257/303, 532, 535, 306, 704; 320/167; 361/306.1, 313, 303
  See application file for complete search history.

(56) References Cited

U.S. PATENT DOCUMENTS

| | | | | |
|---|---|---|---|---|
| 3,593,107 A * | 7/1971 | Chilton et al. | .................. | 363/61 |
| 4,636,714 A | 1/1987 | Allen | | |
| 5,220,483 A * | 6/1993 | Scott | ............................. | 361/313 |
| 5,557,495 A | 9/1996 | Belcher et al. | | |
| 5,597,984 A * | 1/1997 | Mohaupt | ................... | 177/210 C |
| 6,066,537 A * | 5/2000 | Poh | .............................. | 438/393 |
| 6,097,586 A | 8/2000 | Grove | | |
| 6,198,153 B1 * | 3/2001 | Liu et al. | ....................... | 257/532 |
| 6,242,989 B1 | 6/2001 | Barber et al. | | |
| 6,737,698 B1 * | 5/2004 | Paul et al. | ..................... | 257/306 |
| 6,781,482 B2 * | 8/2004 | Laws | ............................ | 333/185 |
| 6,865,727 B2 * | 3/2005 | Frerichs et al. | ................. | 716/55 |
| 6,903,918 B1 * | 6/2005 | Brennan | ................... | 361/306.1 |
| 6,940,707 B2 * | 9/2005 | Nakatani et al. | .............. | 361/303 |
| 7,151,659 B2 | 12/2006 | Kao et al. | | |
| 7,411,774 B2 | 8/2008 | Leeper | | |
| 7,978,456 B2 * | 7/2011 | Fong et al. | ................. | 361/306.2 |
| 2002/0144224 A1 * | 10/2002 | Frerichs et al. | ................... | 716/4 |

* cited by examiner

*Primary Examiner* — Nikolay Yushin
(74) *Attorney, Agent, or Firm* — Howard M. Cohn; Joseph Petrokaitis (57) ABSTRACT

A variable capacitance semiconductor structure is disclosed. Embodiments include a capacitor having three plates, a top plate, a middle plate, and a bottom plate. The top plate serves as a positive plate. The middle and bottom plates serve as ground plates for the capacitor. A switching circuit selects between the middle plate and the bottom plate for use as the ground plate of the capacitor. The middle plate is slotted, allowing electric fields to penetrate through the middle plate to the bottom plate. The slots prevent the electric fields from terminating at the middle plate. A different capacitance value can be selected, depending on whether the middle plate or bottom plate is selected as the ground plate. Logic circuitry is configured to control the selection of plates to achieve a variety of capacitance values.

18 Claims, 7 Drawing Sheets

| Capacitance Value | PS word | CS word |
|---|---|---|
| 1pf | 000b | 000b |
| 1.3 pf | 000b | 001b |
| 1.8 pf | 001b | 011b |
| 2.3 pf | 010b | 111b |
| 2.8 pf | 100b | 111b |
| 3.3 pf | 011b | 111b |
| 3.6 pf | 101b | 111b |
| 3.9 pf | 111b | 111b |

VARIABLE CAPACITANCE INTEGRATED CIRCUIT

FIELD OF THE INVENTION

The present invention relates generally to semiconductors, and more particularly, to an improved variable capacitance integrated circuit.

BACKGROUND OF THE INVENTION

Capacitors are used in many types of electronic circuits. With the proliferation of many wireless communication technologies, such as GSM, LTE, CDMA, and others, there is a need for improved amplifiers, antenna circuits, and receivers that are capable of handling various frequency ranges. Discrete capacitors consume valuable real estate on an integrated circuit. As the trend of smaller, more portable, electronic devices continues, it is desirable to fabricate smaller integrated circuits. Hence, it is desirable to have an improved variable capacitance circuit to address the aforementioned design challenges.

SUMMARY OF THE INVENTION

In a first aspect, embodiments of the present invention provide a capacitor comprising: an elongated top plate; an elongated middle plate disposed below the top plate, wherein the middle plate comprises a plurality of slots and a plurality of plate strips; an elongated bottom plate disposed below the middle plate; and a dielectric layer disposed between each plate.

In a second aspect, embodiments of the present invention provide an integrated circuit comprising: a first multiple ground plate capacitor; a second multiple ground plate capacitor connected to the first multiple ground plate capacitor; wherein the first multiple ground plate capacitor and second multiple ground plate capacitor comprise: an elongated top plate; an elongated middle plate disposed below the top plate, wherein the middle plate comprises a plurality of slots; an elongated bottom plate disposed below the middle plate; and a dielectric layer disposed between each plate.

In a third aspect, embodiments of the present invention provide an integrated circuit comprising: a plurality of multiple ground plate capacitors connected in parallel, wherein each multiple ground plate capacitor comprises: an elongated top plate; an elongated middle plate disposed below the top plate, wherein the middle plate comprises a plurality of slots; an elongated bottom plate disposed below the middle plate; and a dielectric layer disposed between each plate; a switching circuit comprising a plate select signal input corresponding to each multiple ground plate capacitor, which is configured and disposed to select the middle plate when a plate select signal is asserted, and which is configured and disposed to select the bottom plate when a plate select signal is deasserted, and wherein the switching circuit further comprises a capacitor select signal input corresponding to each multiple ground plate capacitor; and wherein the integrated circuit comprises a processor configured and disposed to assert a plurality of plate select signals and capacitor select signals to achieve a desired capacitance value.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Often, similar elements may be referred to by similar numbers in various figures (FIGS) of the drawing, in which case typically the last two significant digits may be the same, the most significant digit being the number of the drawing figure (FIG). Furthermore, for clarity, some reference numbers may be omitted in certain drawings.

DETAILED DESCRIPTION

Embodiments of the present invention provide a variable capacitance semiconductor structure. Embodiments include a capacitor having three plates, a top plate, a middle plate, and a bottom plate. The top plate serves as a positive plate. The middle and bottom plates serve as ground plates for the capacitor. A switching circuit selects between the middle plate and the bottom plate for use as the ground plate of the capacitor. The middle plate is slotted, allowing electric fields to penetrate through the middle plate to the bottom plate. The slots prevent the electric fields from terminating at the middle plate. A different capacitance value can be selected, depending on whether the middle plate or bottom plate is selected as the ground plate. Logic circuitry is configured to control the selection of plates to achieve a variety of capacitance values.

Figure 1:
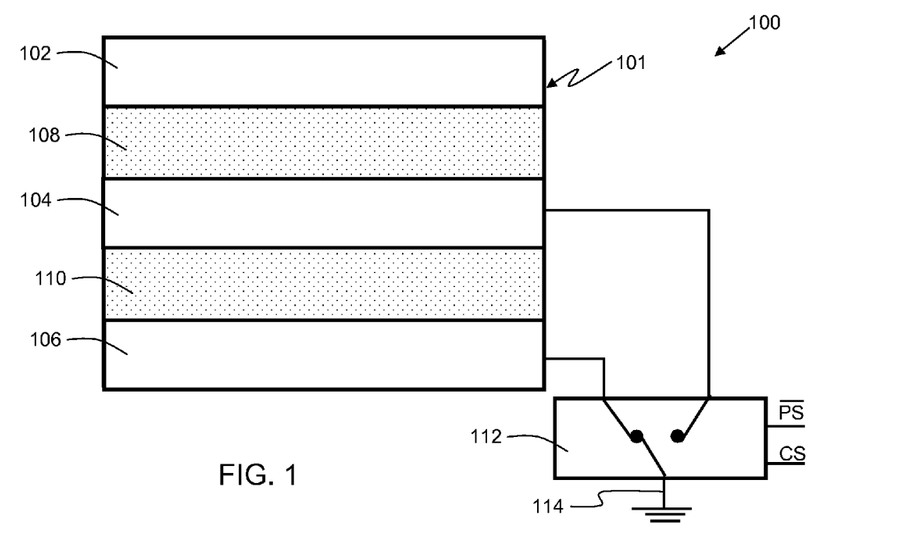
FIG. 1 shows a side view of a variable capacitance circuit in accordance with an embodiment of the present invention in a bottom plate configuration.

FIG. 1 shows a side view of a variable capacitance circuit 100 in accordance with an embodiment of the present invention in a bottom plate configuration. Circuit 100 comprises multiple ground plate capacitor structure 101. Capacitor structure 101 comprises top plate 102, middle plate 104, and bottom plate 106. Disposed in between top plate 102 and middle plate 104 is dielectric layer 108. Disposed in between middle plate 104 and bottom plate 106 is dielectric layer 110. In embodiments, the dielectric layers 108 and 110 are comprised of oxide, such as silicon oxide. In embodiments, the top plate 102, middle plate 104, and bottom plate 106 may be comprised of copper. In other embodiments, the top plate 102, middle plate 104, and bottom plate may be comprised of tungsten.

A switching circuit 112 is configured to select between middle plate 104 and bottom plate 106 as the ground plate. In embodiments, switching circuit 112 comprises a plate select signal input (PS) which is configured such that, when PS is deasserted, the bottom plate 106 is electrically connected to ground 114. In embodiments, switching circuit may be implemented with field effect transistors (FETs). Switching circuit 112 may also include a capacitor select (CS) signal input to allow the capacitor to be disabled or enabled, depending on the state of the CS signal.

Figure 2:
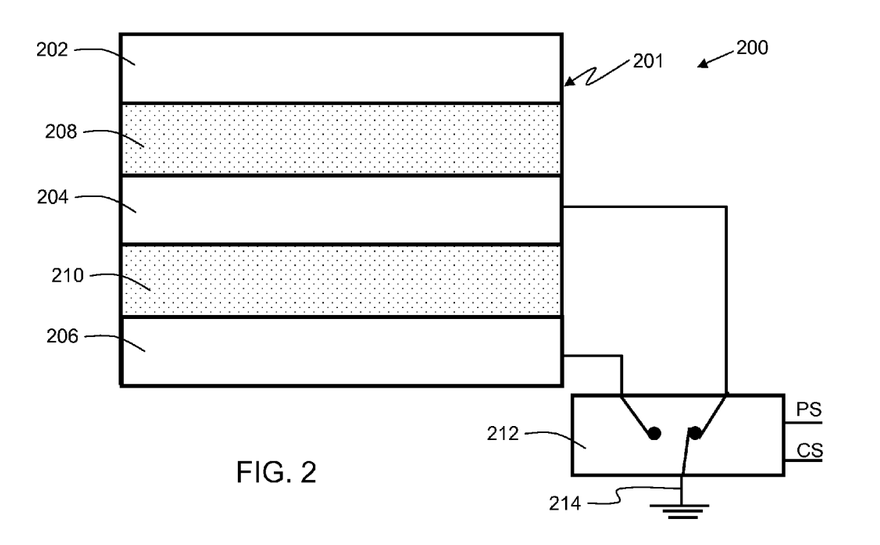
FIG. 2 shows a side view of an embodiment of the present invention in a middle plate configuration.

FIG. 2 shows a side view of a variable capacitance circuit 200 in accordance with an embodiment of the present invention in a middle plate configuration. As stated previously, similar elements may be referred to by similar numbers in various figures (FIGS) of the drawing, in which case typically the last two significant digits may be the same. For example, top plate 202 of FIG. 2 is similar to top plate 102 of FIG. 1. In this view, plate select signal (PS) is asserted, causing switching circuit 212 to connect middle plate 204 to ground 214. The capacitance value of the variable capacitance circuit depends on a variety of factors, such as the area of the plates, and the distance between the plates. The variable capacitance circuit has two possible values. When the middle plate is selected, the variable capacitance circuit has a high value. When the bottom plate is selected, the variable capacitance circuit has a low value. In some embodiments, when the middle plate is selected, the high capacitance value may range from about 1 pF to about 1.5 pF, and when the bottom plate is selected, the low capacitance value may range from about 500 femtoFarads (fF) to about 750 fF. By manipulating the plate area, and plate spacing, different high and low capacitance values can be achieved.

Figure 3:
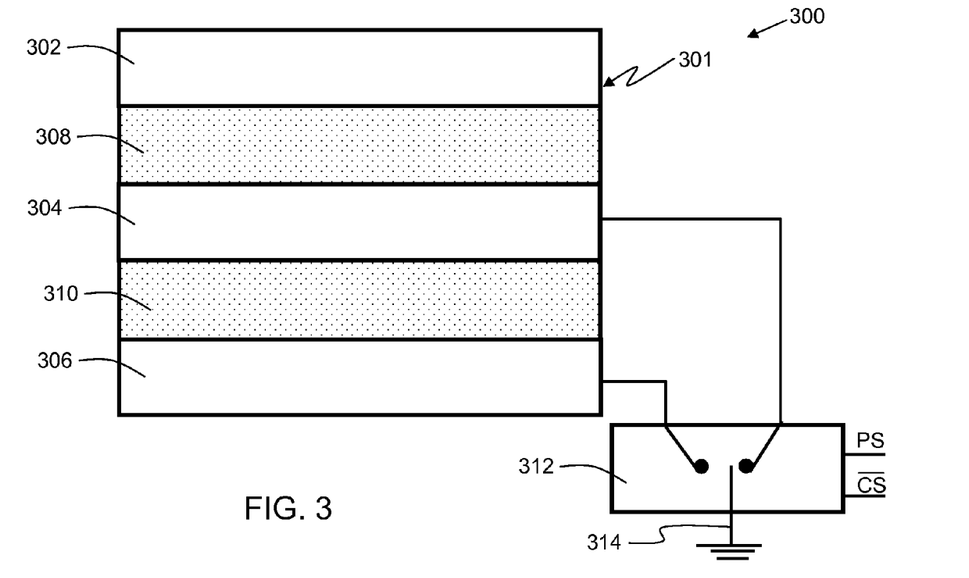
FIG. 3 shows a side view of an embodiment of the present invention in a floating configuration.

FIG. 3 shows a side view of a variable capacitance circuit 300 in accordance with an embodiment of the present invention in a floating configuration. In this view, capacitor select signal (CS) is deasserted, causing switching circuit 312 to be configured such that both the middle plate 304 and the bottom plate 306 are floating (disconnected from ground 314). In this way, the multiple ground plate capacitor structure 301 is disabled, effectively removing it from a circuit.

Figure 4:
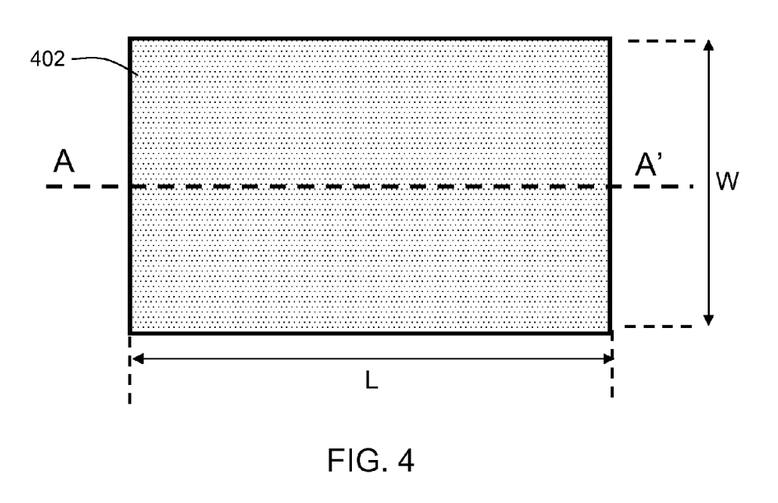
FIG. 4 shows a top-down view of a top/bottom plate in accordance with embodiments of the present invention.

FIG. 4 shows a top-down view of a top/bottom plate 402 in accordance with embodiments of the present invention. The plate 402 is a solid (non-slotted) plate which may be utilized as a top or bottom plate of a multiple ground plate capacitor structure in accordance with embodiments of the present invention. The plate 402 is elongated, with a major axis indicated by line A-A' along the length L of plate 402, where the length L is greater than the width W of the plate 402.

Figure 5:
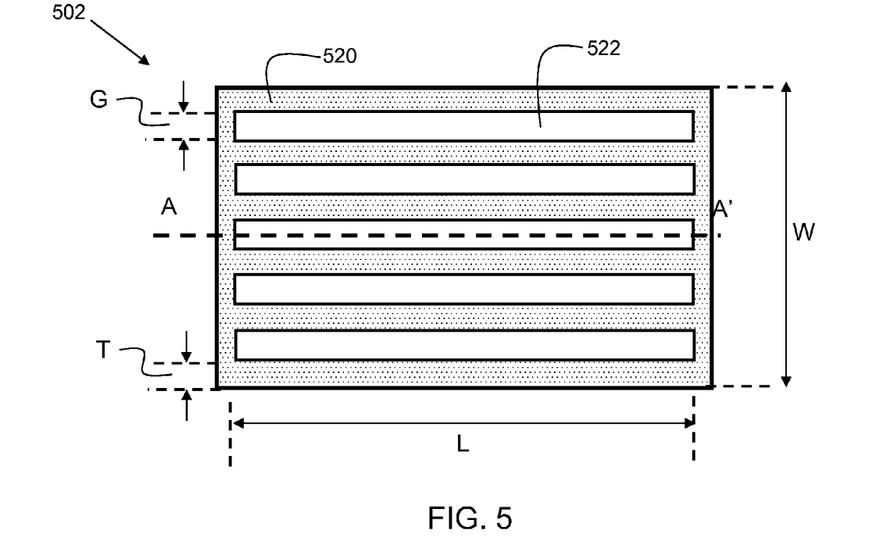
FIG. 5 shows a top-down view of a middle plate in accordance with embodiments of the present invention.

FIG. 5 shows a top-down view of a middle plate 502 in accordance with embodiments of the present invention. Middle plate 502 comprises a plurality of slots 522, which are voids in the plate. The pattern of the slots is such that there is a plurality of plate strips 520 and slots 522 that appear as interleaved elongated portions. The plate strips 520 have a width T, and the slots 522 have a width G. In embodiments, T is approximately equal to G, such that the slot ratio (ratio of slot width G to plate strip width T) is approximately equal to 1. In some embodiments, the slot ratio may range from about 0.8 to about 1.22. The plurality of slots 522 is oriented along a major axis (A-A') of the elongated middle plate 502. In some embodiments, each slot 522 may have a width ranging from 0.3 times to 0.7 times the width of each plate strip 520.

Figure 6:
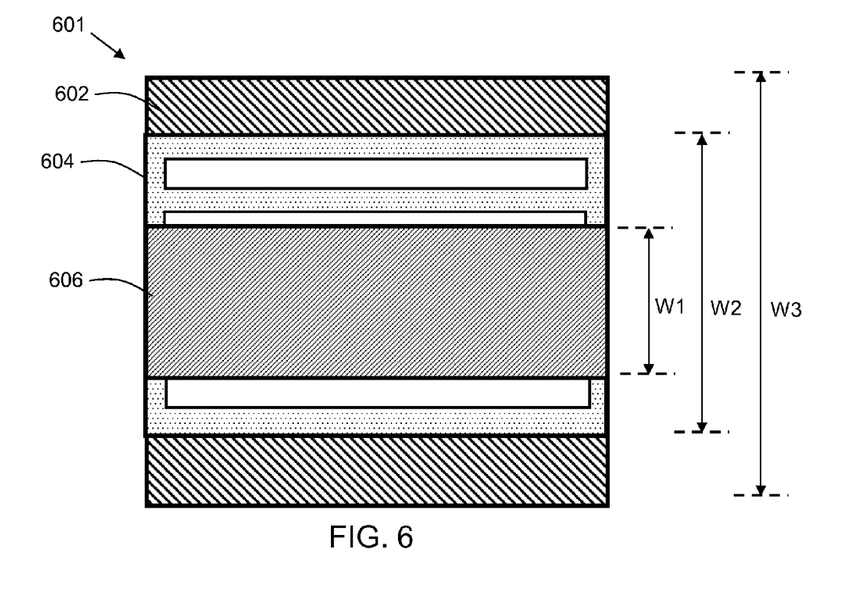
FIG. 6 shows a top-down view of a multiple ground plate capacitor in accordance with alternative embodiments of the present invention.

FIG. 6 shows a top-down view of a multiple ground plate capacitor 601 in accordance with alternative embodiments of the present invention. In this embodiment, the bottom plate 602 has a width W3, the middle plate 604 has a width W2, and the top plate 606 has a width W1, where W1<W2<W3.

Figure 7:
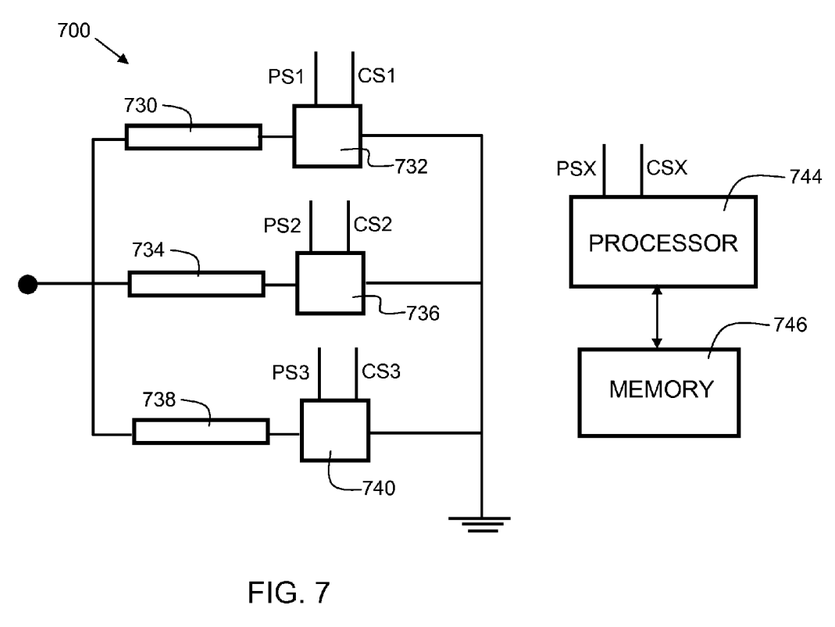
FIG. 7 shows a schematic view of a variable capacitance circuit in accordance with alternative embodiments of the present invention.

FIG. 7 shows a schematic view of a variable capacitance circuit 700 in accordance with alternative embodiments of the present invention. Circuit 700 comprises a plurality of multiple ground plate capacitors (730, 734, and 736) connected in parallel. For each multiple ground plate capacitor (MGPC) there is a corresponding switching circuit (732, 736, and 740). Switching circuit 732 corresponds to MGPC 730, and has plate select signal PS1 and capacitor select signal CS1. Switching circuit 736 corresponds to MGPC 734, and has plate select signal PS2 and capacitor select signal CS2. Switching circuit 740 corresponds to MGPC 738, and has plate select signal PS3 and capacitor select signal CS3. A processor 744 is configured to generate a plurality of output signals for the plate select (indicated as PSX) and capacitor select (indicated as CSX). In embodiments, processor 744 may comprise a microcontroller. In embodiments, the processor 744 and circuit 700 may reside on the same integrated circuit. In practice, an individual set of PS and CS signals may be output from the processor for each MGPC. In some embodiments, an addressable scheme may be employed. The processor 744 is configured and disposed to retrieve machine instructions from non transitory memory 746. The processor 744 executes the instructions to control the variable capacitance circuit and achieve a desired capacitance value. In alternative embodiments, MGCPs may be connected in series instead of, or in addition to, a parallel connection.

Figure 8:
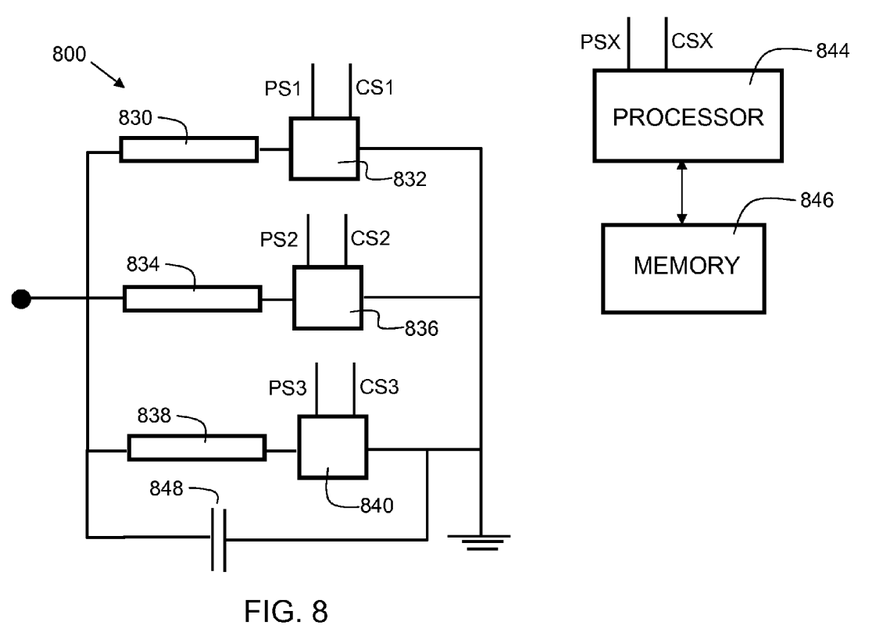
FIG. 8 shows a schematic view of a variable capacitance circuit in accordance with alternative embodiments of the present invention.

FIG. 8 shows a schematic view of a variable capacitance circuit 800 in accordance with alternative embodiments of the present invention. Circuit 800 is similar to circuit 700 of FIG. 7, except that circuit 800 also comprises fixed shunt capacitor 848. When capacitor select signals CS1, CS2, and CS3 are all deasserted, the capacitance of the variable capacitance circuit 800 defaults to the value of capacitor 848. In some embodiments, the value of capacitor 848 may range from about 0.5 picofarads (pF) to about 1.5 pF. In some embodiments, the MGPCs (830, 834, 838) may have values ranging from about 400 femtoFarads (fF) to about 2 pF. In some embodiments, each MGPC may have a different set of high and low values. For example. MGPC 830 may have a high value of 2 pF and a low value of 1 pF, MGPC 834 may have a high value of 700 fF and a low value of 350 fF, and MGPC 838 may have a high value of 400 fF and a low value of 200 fF. Furthermore, each MGPC can be effectively removed from the capacitive circuit by deasserting the corresponding capacitor select signal. For example, considering the following signal states:

PS1=asserted (low capacitance value)
CS1=asserted
PS2=deasserted (high capacitance value)
CS2=asserted
PS3=don't care CS3=deasserted Then based on the example values presented above, the total capacitance for circuit 800 is the parallel capacitance of the fixed shunt capacitor 848, the low capacitance value for MGPC 830, and the high capacitance value for MGPC 834. Since the CS3 signal is deasserted, MGPC 838 is not contributing to the capacitance of circuit 800. Therefore, using the example values stated previously, the total capacitance is 1 pF (capacitor 848)+1 pF (low value for MGPC 830)+700 fF (high value for MGPC 834)=2.7 pF. Since there are 3 states for each MGPC (high, low, and floating) there are 3×3×3=27 possible different capacitance values achievable from circuit 800.

Figure 9:
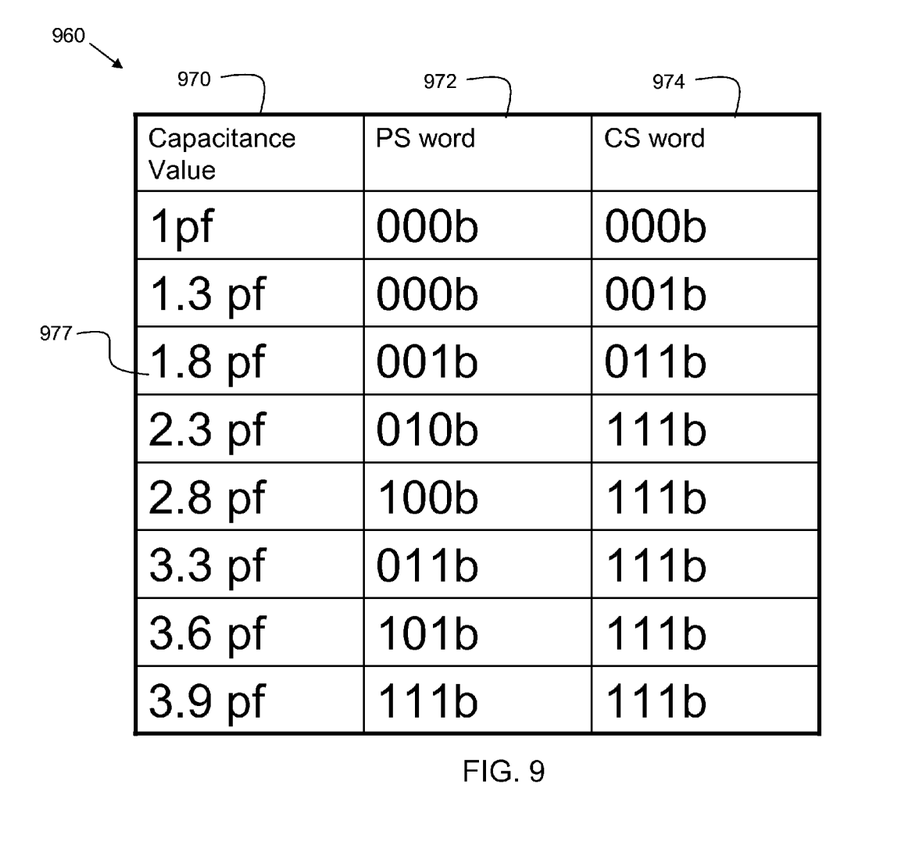
FIG. 9 shows a representation of a lookup table in accordance with embodiments of the present invention.

FIG. 9 shows a representation of a lookup table 960 in accordance with embodiments of the present invention.

Lookup table 960 may be stored in memory (e.g. 846 of FIG. 8). Lookup table 960 may have multiple columns for associated data. Column 970 is a capacitance value. Column 972 stores a plate select word (shown in binary), and column 974 shows a capacitor select word (shown in binary). Each bit in the words corresponds to a different MGPC. For an example with the 3-bit words of table 960, the most significant bit may correspond to switching circuit 832 (see FIG. 8), the middle bit may correspond to switching circuit 836, and the least significant bit may correspond to switching circuit 840. The lookup table 960 is merely exemplary, and intended to be illustrative. It is not a comprehensive table for all possible values. The processor (e.g. 844 of FIG. 8) is configured to access lookup table 960 which contains data corresponding to a predetermined capacitance value, capacitor select setting, and plate select setting. Based on the information in lookup table 960, the processor configures the plate select and capacitor select signals. For example, to achieve a capacitance of 1.8 pf, MGPC 830 has its capacitor select signal deasserted, and MGPC 834 and MGPC 838 have their CS signals asserted. The plate select signal for MGPC 830 is a "don't care" condition, since the CS signal is deasserted. The signal PS2 is deasserted and the signal PS3 is asserted, based on the PS word values in column 972 corresponding to the row 977 for 1.8 pF.

Figure 10:
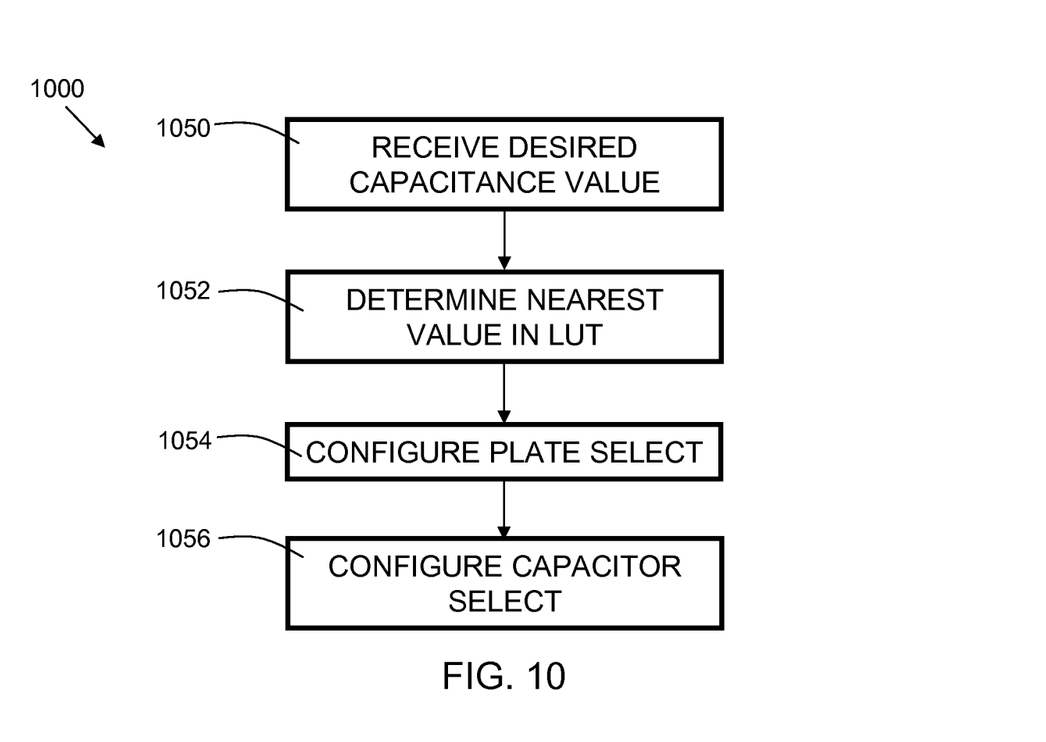
FIG. 10 shows a flowchart for embodiments of the present invention.

FIG. 10 shows a flowchart 1000 for embodiments of the present invention. In process step 1050, a desired capacitance value is received by the processor. In process step 1052, the closest capacitance value in the lookup table (LUT) (column 970 in FIG. 9) is determined. In process step 1054, the capacitor select signals for each switching circuit are configured, based on the values in the lookup table (column 974 in FIG. 9). In process step 1056, the plate select signals for each switching circuit are configured, based on the values in the lookup table (column 972 in FIG. 9).

As can now be appreciated, embodiments of the present invention provide a variable capacitance structure with reduced space requirements, since the multiple ground plate capacitors are capable of producing two different capacitance values, depending on the state of the plate select signal. Additionally, the capacitor select signal serves to remove a multiple ground plate capacitor from a circuit, increasing the number of possible capacitor values for the circuit.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A capacitor comprising:
   an elongated top plate, wherein the top plate is a solid, non-slotted plate;
   an elongated middle plate disposed below the top plate, wherein the middle plate comprises a plurality of voids and a plurality of plate strips, wherein each void of the plurality of voids is oriented along a major axis of the elongated middle plate, and wherein each void is completely enclosed by the middle plate;
   an elongated bottom plate disposed below the middle plate, wherein the bottom plate is a solid, non-slotted plate; and
   a dielectric layer disposed between each plate.

2. The capacitor of claim 1, wherein the elongated middle plate has a ratio of a void width to a plate strip width ranging from about 0.8 to about 1.22.

3. The capacitor of claim 1, wherein each void of the plurality of voids has a width ranging from 0.3 times to 0.7 times the width of each plate strip of the plurality of plate strips.

4. The capacitor of claim 1, wherein the top plate, middle plate, and bottom plate are comprised of copper.

5. The capacitor of claim 1, wherein the top plate, middle plate, and bottom plate are comprised of tungsten.

6. The capacitor of claim 1, wherein the dielectric layer is comprised of oxide.

7. The capacitor of claim 1, further comprising a switching circuit comprising a plate select signal input, which is configured and disposed to select the middle plate when a plate select signal is asserted, and which is configured and disposed to select the bottom plate when a plate select signal is deasserted.

8. An integrated circuit comprising:
   a first multiple ground plate capacitor;
   a second multiple ground plate capacitor connected to the first multiple ground plate capacitor;
   wherein the first multiple ground plate capacitor and second multiple ground plate capacitor comprise:
      an elongated top plate, wherein the top plate is a solid, non-slotted plate;
      an elongated middle plate disposed below the top plate, wherein the middle plate comprises a plurality of voids, wherein each void of the plurality of voids is oriented along a major axis of the elongated middle plate, and wherein each void is completely enclosed by the middle plate;
      an elongated bottom plate disposed below the middle plate, wherein the bottom plate is a solid, non-slotted plate; and
      a dielectric layer disposed between each plate.

9. The integrated circuit of claim 8, wherein the elongated middle plate has a ratio of a void width to a plate strip width ranging from about 0.8 percent to about 1.22.

10. The integrated circuit of claim 8, further comprising a switching circuit comprising a plate select signal input, which is configured and disposed to select the middle plate when a plate select signal is asserted, and which is configured and disposed to select the bottom plate when a plate select signal is deasserted.

11. The integrated circuit of claim 10, wherein the switching circuit further comprises a capacitor select signal.

12. The integrated circuit of claim 8, wherein the first multiple ground plate capacitor and the second multiple ground plate capacitor are connected in series.

13. The integrated circuit of claim 8, wherein the first multiple ground plate capacitor and the second multiple ground plate capacitor are connected in parallel.

14. The integrated circuit of claim 13, further comprising a shunt capacitor connected in parallel with the first multiple ground plate capacitor and the second multiple ground plate capacitor.

15. An integrated circuit comprising:
   a plurality of multiple ground plate capacitors connected in parallel, wherein each multiple ground plate capacitor comprises:
      an elongated top plate, wherein the top plate is a solid, non-slotted plate;
      an elongated middle plate disposed below the top plate, wherein the middle plate comprises a plurality of voids, wherein each void of the plurality of voids is oriented along a major axis of the elongated middle plate, and wherein each void is completely enclosed by the middle plate;
      an elongated bottom plate disposed below the middle plate, wherein the bottom plate is a solid, non-slotted plate; and
      a dielectric layer disposed between each plate;
   a switching circuit comprising a plate select signal input corresponding to each multiple ground plate capacitor, which is configured and disposed to select the middle plate when a plate select signal is asserted, and which is configured and disposed to select the bottom plate when a plate select signal is deasserted, and wherein the switching circuit further comprises a capacitor select signal input corresponding to each multiple ground plate capacitor; and wherein the integrated circuit comprises a processor configured and disposed to assert a plurality of plate select signals and capacitor select signals to achieve a desired capacitance value.

16. The integrated circuit of claim 15, wherein the processor is configured to access a lookup table containing data corresponding to a predetermined capacitance value, capacitor select setting, and plate select setting.

17. The integrated circuit of claim 15, further comprising a shunt capacitor connected in parallel with the plurality of multiple ground plate capacitors.

18. The integrated circuit of claim 15, wherein:
   the plurality of slots is oriented along a major axis of the elongated middle plate; and
   wherein the elongated middle plate has a ratio of a void width to a plate strip width ranging from about 0.8 to about 1.22.

* * * * *